(12) United States Patent
Benn et al.

(10) Patent No.: US 7,971,094 B1
(45) Date of Patent: Jun. 28, 2011

(54) METHOD, SYSTEM AND APPARATUS FOR CREATING AND EXECUTING A FAILOVER PLAN ON A COMPUTER NETWORK

(75) Inventors: Paul M. Benn, Danville, CA (US); Balamurali Palaiah, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 207 days.

(21) Appl. No.: 12/397,259

(22) Filed: Mar. 3, 2009

(51) Int. Cl.
*G06F 11/00* (2006.01)

(52) U.S. Cl. ............... 714/13; 714/6.3; 714/11; 714/12; 714/15; 714/46

(58) Field of Classification Search ............. 714/6, 11, 714/12, 13, 15, 46, 6.3
See application file for complete search history.

(56) References Cited

U.S. PATENT DOCUMENTS

| | | | |
|---|---|---|---|
| 7,039,777 B2 * | 5/2006 | Yamagami et al. | 711/162 |
| 7,321,992 B1 * | 1/2008 | Vellore et al. | 714/47 |
| 7,600,146 B2 * | 10/2009 | Liccione et al. | 714/3 |
| 2005/0228947 A1 * | 10/2005 | Morita et al. | 711/114 |
| 2006/0117212 A1 * | 6/2006 | Meyer et al. | 714/4 |
| 2007/0255977 A1 * | 11/2007 | Liccione et al. | 714/4 |
| 2008/0256384 A1 * | 10/2008 | Branson et al. | 714/4 |
| 2009/0094603 A1 * | 4/2009 | Hiltgen et al. | 718/1 |

OTHER PUBLICATIONS

Benn, "Disaster recovery by relocating exchange virtual servers to a different windows cluster" NetApp, Inc., Sunnyvale, CA (17 pp.) Sep. 8, 2005.
Microsoft, "How to move all exchange virtual servers from a production exchange 2003 cluster to a standby exchange 2003 cluster" http://technet.microsoft.com, 2008 Microsoft Corporation (5 pp.).

* cited by examiner

*Primary Examiner* — Robert W Beausoliel, Jr.
*Assistant Examiner* — Charles Ehne
(74) *Attorney, Agent, or Firm* — Perkins Coie LLP (57) ABSTRACT

A failover module generates a user interface to enable an administrative user to define a failover plan for a primary site. The failover plan includes user-specified information for use by multiple operations of a failover process for failing over a server system from the primary site to a failover site. The failover plan can be stored as a data object on a computer system at the failover site. In the event of a serious failure at the primary site, the failover process can be invoked and carried out on the failover site with little or no human intervention, based on the failover plan, to cause the server system to be failed over to the failover site, thereby substantially reducing downtime of the server system and its data.

23 Claims, 4 Drawing Sheets

METHOD, SYSTEM AND APPARATUS FOR CREATING AND EXECUTING A FAILOVER PLAN ON A COMPUTER NETWORK

FIELD OF THE INVENTION

At least one embodiment of the present invention pertains to computer networks, and more particularly, to a technique for creating and executing an failover plan for an application on a computer network.

BACKGROUND

In an enterprise environment it is often essential to backup important software and data. One frequently used backup technique is data mirroring, in which data stored at a primary site is mirrored to a secondary site. The mirrored data can be used instead of the primary data in the event of a failure of the primary site or loss or corruption of the primary data.

In some situations it may be necessary to reconstruct an entire primary site, including all of its applications and data, at another site, called a "failover site", such as when the entire primary site or a substantial part of it fails. This process is called "failover" or "failing over". Sometimes failover is done as a planned activity, such as when it is necessary to upgrade hardware or software or perform routine maintenance on the primary site.

For some applications and use cases, failover can be very complicated and time consuming, requiring the administrator who oversees the process to have significant depth of technical knowledge about the system. Consider for example, a scenario in which an application server runs on two or more clustered server nodes at a primary site. Data used by the application server may be backed up to a separate storage server at the primary site via a network, such as a local area network (LAN). If a major part of this system fails, reconstructing the system and all of its data to its pre-failure state at a failover site can be extremely time consuming, taking hours to accomplish, due to the complexity of the system and the amount of data to be recovered. There is also significant likelihood of human error occurring during the failover process. These factors can result in significant downtime of the application and its data, which could have serious adverse business consequences.

SUMMARY

According to certain embodiments of the technique introduced here, a failover module generates a user interface which enables a user to define a failover plan for a primary site. The failover plan includes user-specified information for use by various operations of a failover process, for failing over a server system from the primary site to a failover site. The failover plan can include, for example, information identifying and specifying details about the failover source, the failover destination, and storage resources of the source and destination, information descriptive of mirroring relationships between the primary and failover sites, and information descriptive of logical unit number (LUN) connections. The failover plan can be stored as a data object on a computer system at least at the failover site and, if desired, at other locations.

In the event of a serious failure at the primary site or a planned failover, the failover process can be invoked from the user interface and carried out on the failover site based on the failover plan, with little or no human intervention or manual configuration, to cause the server system to be failed over to the failover site. This technique enables the failover process to be completed much more quickly than it could otherwise, while substantially reducing the likelihood of human error in the process. As such, downtime of the server system and its data is substantially reduced. Further, to the extent the failover process is initiated manually, initiation of the process requires very little technical knowledge by the user initiating the process.

Other aspects of the technique will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for creating and executing an failover plan for an application on a computer network are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
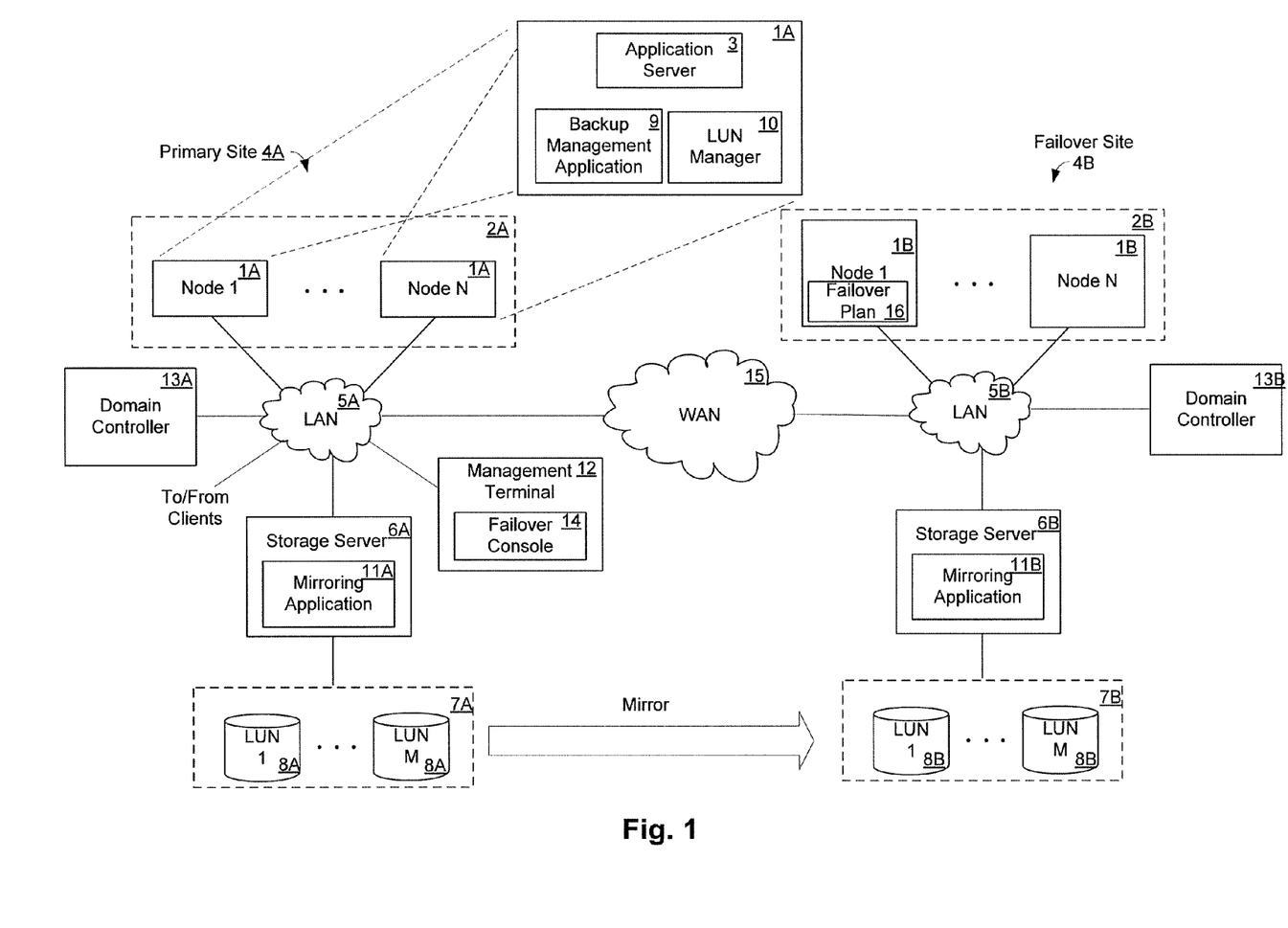
FIG. 1 illustrates a system which includes a primary site and a failover site, each including multiple computer systems, in which a failover plan can be created and/or executed according to the technique introduced here.

FIG. 1 illustrates a system in which the technique introduced here can be implemented. It can be assumed that the system is constructed primarily for the purpose of operating an application server 3. To facilitate explanation, it is assumed that the application server 3 is a version of Microsoft Exchange, which is an enterprise electronic messaging and unified communications system. Other embodiments, however, may be based on a different type of application server.

It is further assumed, only for purposes of description, that the application server 3 operates in a clustered environment as shown, although that may not be the case in other embodiments. Thus, in the illustrated embodiment the application server 3 is virtualized across a cluster 2A (or 2B) of server nodes 1A (or 1B). For example, a cluster 2A or 2B can form an Exchange Virtual Server (EVS). One reason it may be desirable to virtualize an application server this way, particularly Microsoft Exchange, is that in Microsoft Active Directory, Exchange uses the host computer's identity rather than its own machine name. Active Directory is a directory service used to store information about network resources across a domain and also to centralize a network. Because Exchange uses its host system's identity, in a failover situation a failed, non-virtualized Exchange server would have to be rebuilt on a new server at a failover site, using the same name that it had on the primary site. However, this cannot be accomplished while the failed Exchange server is still on the network.

Having to provide new hardware in this regard results in a very time-consuming recovery process.

On the other hand, if Exchange is virtualized across a cluster, the cluster as a whole can be given a virtual machine name, which is different from the machine name of any host (node) in the cluster. In the event of a failover, the virtual machine name can be quickly and easily mapped to the failover site, without losing any data consistency.

In furtherance of the above-described virtualization approach, as shown in FIG. 1 an instance of the application server 3 is implemented on each of N (multiple) nodes 1A that form a cluster, at a primary site 4A. In one embodiment, the cluster 2A forms an EVS. Various clients (not shown) can access the EVS via a local area network (LAN) 5A. The EVS (cluster 2A) is also coupled to a primary storage server 6A through the LAN 5. The main function of the primary storage server 6A is to store (persistently) data used by the application server 3. The primary storage server 6A is also configured to backup the application server 3 and the application server's data. This may be done, for example, by periodically creating persistent point-in-time images, or "snapshots", of the application server 3 and its data. Note that the primary storage server 6A itself can also be implemented in a distributed/clustered manner, although it is depicted as a monolithic device in FIG. 1 to simplify the illustration. The active data and backup data are stored in a nonvolatile storage subsystem 7A, in the form of various logical units ("LUNs") 8A.

As shown in FIG. 1, each of the nodes 1A of cluster 2A includes an instance of the application server 3, as well as an instance of a backup management application 9 and a LUN manager 10. Each node also includes an operating system (not shown).

The main purpose of the LUN manager 10 is to provide the operating system in the node 1A with services to create and manage the LUNs 8A. The main purpose of the backup management application 9 is to create, restore and manage remote backups, based on user-defined policies and/or configuration data. More specifically, the backup management application 9 allows a user (e.g., a network administrator) to configure backups of the application server's data to the storage subsystem 7A, by use of the primary storage server 6A. The LUN manager 10 is capable of restoring data (LUNs), and the backup management application 9 can reconstruct the application server 3 using the restored LUNs. Additionally, the storage servers 6A and 6B can be configured to cause LUNs 8A on the primary site 4A to be mirrored to the failover site 4B, as discussed further below.

In one embodiment of the technique introduced here, various elements mentioned above are embodied as follows: The operating system (not shown) in each of the nodes 1A, 1B is a version of Microsoft Windows; the LUN manager 10 is a version of SnapDrive software from NetApp, Inc. ("NetApp") of Sunnyvale, Calif.; the application server 3 is a version of Microsoft Exchange and is virtualized across a cluster 2A (or 2B) to form an EVS; the backup management application 9 is the version of NetApp's SnapManager for Microsoft Exchange (SME) which corresponds to the version of SnapDrive being used; and the mirroring application 11A (or 11B) each are a combination of NetApp's SnapMirror and SnapRestore products, which are snapshot-based backup and restore applications. The remainder of this description is based on this embodiment, although it is contemplated that the basic techniques described here could be applied in embodiments in which one or more of these components is embodied differently. Functions of the backup management application 9 and the LUN manager 10 can be configured by an administrative user through the management terminal 12.

During normal operation of the primary site 4A, the mirroring application 11A, under control of the backup application 9, causes the LUNs 8A at the primary site 4A to be periodically mirrored to the storage subsystem 7B of the failover site 4B, in cooperation with a mirroring application 11B at the failover site 4B.

A domain controller 13 is also connected to the LAN 5 and stores network resource information that can be accessed by other devices on the LAN 5. In one embodiment the domain controller 13 is a Microsoft Active Directory domain controller, as henceforth assumed here to facilitate description. The primary function of the Active Directory domain controller 13 is to provide LDAP-like directory services for the Microsoft Windows networking infrastructure. Domain name services (DNS) and Kerberos-bases authentication can be provided by this device as well. Examples of information stored in Active Directory are the Exchange Server's host name, its Exchange name and the database layout.

Also coupled to the LAN 5 is a management terminal 12, from which an administrative user can perform various administrative functions on devices at the primary site for a or the failover site 4B. For example, the management terminal 12 may allow the administrative user to provision storage on the primary site 4A or failover site 4B, establish the configuration of a cluster 2A or 2B and its individual nodes, set up backup schedules, etc.

In addition, in accordance with the technique introduced here, the management terminal 12 also includes a failover console 14. The failover console 14 is a module which generates a user interface to enable the user to define a failover plan for a primary site and to invoke a failover process when necessary or desirable. The failover console 14 can be implemented in programmable circuitry (e.g., one or more processors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc. A failover plan is represented in the system as a data object, which includes user-specified information for use by various operations of an automated failover process, for failing over the primary site to a failover site. The failover plan can include, for example, information identifying and specifying details about a failover source, a failover destination, and storage resources of the failover source and destination, information descriptive of mirroring relationships between the primary and failover sites, and information descriptive of logical unit number (LUN) connections. The failover console 14 may be implemented in the form of software, firmware, specially designed hardware, or any combination thereof. The user interface that it generates can be presented to the user in the form of a conventional "wizard", for example.

Once defined, the failover plan 16 can be stored as a data object at the failover site 4B. For redundancy, the failover plan 16 may be stored in each node 1B in the cluster 2B at the failover site 4B, as shown. In addition, the failover plan may also be stored in one or more places at the primary site 4A and/or other sites (not shown).

In the illustrated embodiment, the failover site 4B is coupled to the primary site 4A through a wide area network (WAN) 15. In the event of a serious failure at the primary site 4B or a planned failover, the failover process can be invoked from the failover console's user interface and carried out on the failover site 4B based on the failover plan 16, to cause the application server system to be failed over to the failover site 4B. Among other operations, the failover plan 16 defines the specific configuration, connections, etc. that will need to be established at the failover site 4B in order to completely and accurately reconstruct the primary site 4A at the failover site 4B. The failover process includes reconstructing the primary site 4A, including the clustered application server 3 and its data, on the failover site 4B, by using data previously mirrored from the primary site 4A to the failover site 4B. The failover process can be invoked from the management terminal 12 or from any other computer or device connected so as to be able to communicate with the failover site 4B, and is executed automatically or with very little human intervention.

In one embodiment, the failover plan is stored as an extensible markup language (XML) document, which is treated as an object by the system. The following shows a simplified example of the format of a failover plan in XML, indicating some of its potential content, according to one embodiment of the technique introduced here:

```
<?xml version="1.0"?>
<drplan [an artifact that represents the business continuance aspects of an application]
   planname="[name of failover pan]"
   description=" "[name of failover pan]
   creation_time="[creation date and time of failover plan
   validation_status="[validated or not validated]"
   planpath="[pathname to location where failover plan is
      stored]">
   <applicationdata . . . >[application information]
   <siteinfo . . . >[primary site information]
      <hostinfo . . . >[host information]
      <luninfo . . . >[LUN information]
   </siteinfo>
   <siteinfo . . . >[failover site information]
      <hostinfo . . . >
      <luninfo . . . >
   </siteinfo>
   <mirrors productionstorage, DR storage >[the mirrors, the
      connection, the primary site and the failover site]
   . . .
   </mirrors>
      <contactinfo . . . >
   </drplan>
```

The user interface generated by the failover console 14 can be presented to the user in the form of a "wizard". The details of the appearance and content of the user interface are not germane to this description; any conventional or convenient format of user interface can be employed. Nonetheless, the following features serve as examples illustrate the possible form and content of the user interface. Data can be input by the user by entering text into various fields, selecting from drop-down lists or menus, etc. Similarly, various actions can be triggered (e.g., saving a failover plan or initiating the failover process) by the user, for example, by selecting from drop-down lists or menus, clicking on soft buttons, etc.

The user interface generated by the failover console 14 can include, among other things, an indication of the mirroring status for the volumes that are in use, and an indication of the status of the primary cluster 2A and failover cluster 2B (whether it is running or not and which node is the owner of a particular resource group). The user interface can also display a status indicator that shows which step in the failover plan definition process or the failover process is currently being performed, which steps have already been performed and which steps remain to be performed. In addition, the user interface may also include a "Test" button or other similar control to initiate a test of the conditions prior to performing a failover or failback operation.

Before any failover is performed, some preliminary setup at the failover site 4B is done. For example, the equipment at the failover site 4B is set up to include substantially identical hardware and software (including the same versions of software) to that of the primary site 4A, although the physical configuration of nodes 1B at the failover site 4B need not exactly match that of nodes 1A at the primary site 4A. The cluster 2B at the failover site 4B has an instance of the application server 3, backup management application 9 and LUN manager 10 installed in it, preferably before normal operation commences at the primary site 4k The storage server 6B at the failover site 4B also has an instance of the mirroring application 11B installed in it.

The failover site 4B also has a domain controller 13B, which has a copy of the Active Directory database maintained by domain controller 13A. Before the primary site 4A is allowed to fail over to the failover site, in one embodiment Active Directory is installed at and started in the replicated domain controller 13B. This means that a domain controller that is from the same domain and that is up-to-date with the current Active Directory should be in place.

The user will also preconfigure the clusters 2A and 2B and basic cluster resources at the primary site 4A and failover site 4B, respectively. The basic cluster resources are the minimum resources needed to initiate operation of a new cluster. These resources can include, for example, an IP Address resource, a Host Name resource and a Quorum resource, and may also include, for example, a Microsoft Distributed Transaction Coordinator (MSDTC) cluster resource for certain embodiments of the application server 3 (e.g., for certain versions of Microsoft Exchange). In addition to the basic cluster group, the user may also create a new cluster resource group for the EVS as well as the IP Address and Host Name cluster resources for the EVS.

Figure 2:
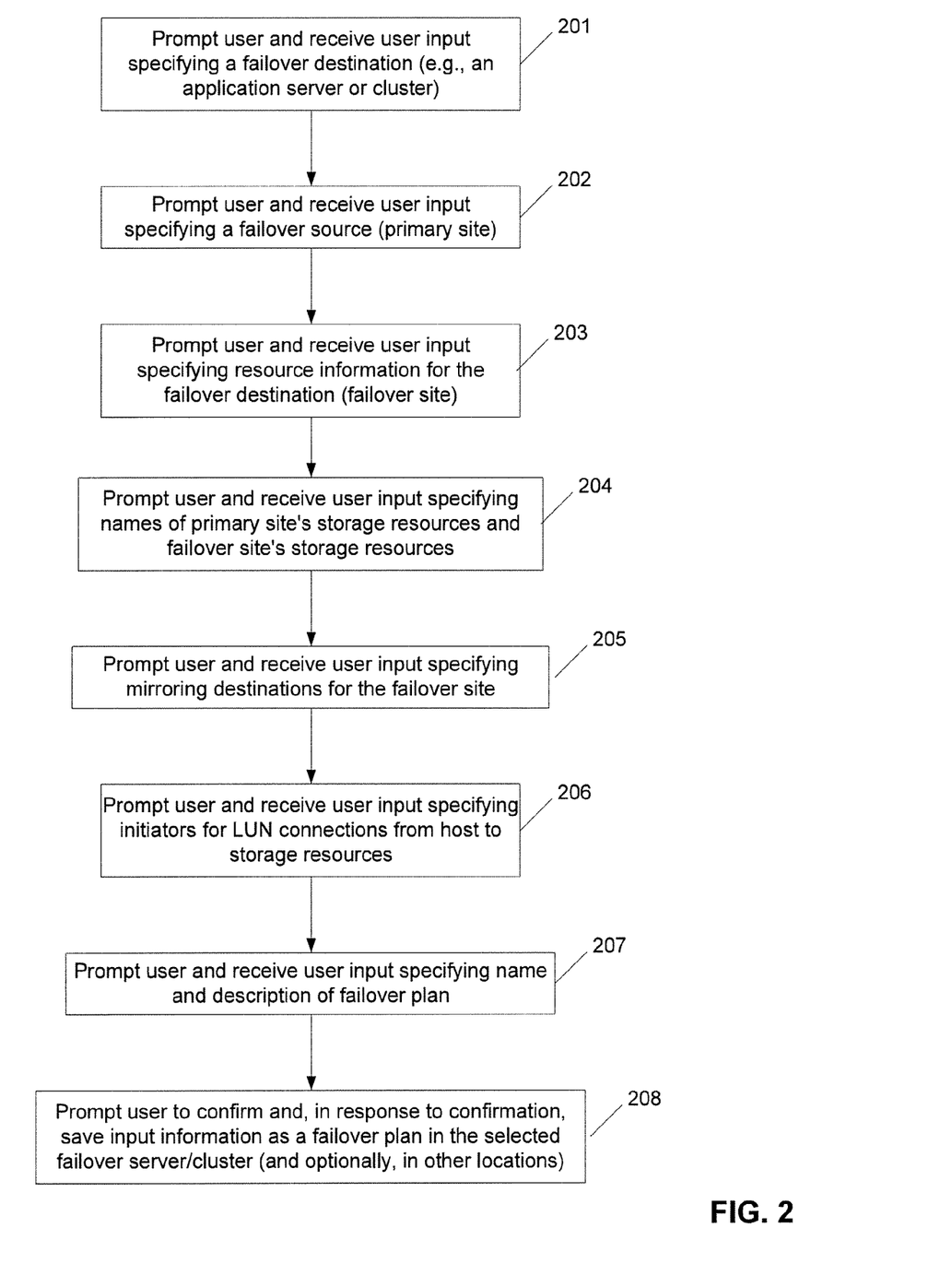
FIG. 2 is a flow diagram illustrating a process for creating a failover plan.

FIG. 2 illustrates an example of the process for creating a failover plan according to the technique introduced here. In one embodiment the process is performed by the failover console 14. Note that to facilitate description, the terms "primary site" (e.g., 4A) and "failover source" are used interchangeably throughout this description. Likewise, the terms "failover site" (e.g., 4B) and "failover destination" are also used interchangeably, to facilitate description.

To trigger the process, the user selects an appropriate control or option in the failover module's user interface (e.g., "Create failover plan"). In response, the failover console 14 displays a list of servers or clusters (hosts) available for selection as a failover destination (failover site) and prompts the user (e.g., a network administrator) to select a server node or cluster as the failover destination for the failover plan. The failover console then receives user input specifying the failover destination for the failover plan (201). In one embodiment in which the application server 3 is Microsoft Exchange and is clustered, this input is the name of an EVS. The user can select the primary site 4A if he wishes to create a local recovery plan, or he can select a different site to create a remote recovery plan, such as failover site 4B. In a local recovery scenario, the application data can be recovered in the same host(s) using a different set of storage resources. In a remote recovery scenario, the application data is recovered in the remote host(s) using a different set of storage resources.

The failover console 14 then displays a list of application servers (e.g., Microsoft Exchange servers) available for selection as the failover source (primary site). The failover console 14 then prompts the user to select one as the failover source and receives user input specifying the user's selection of the failover source for the failover plan (201). As indicated, this input may be the name of an EVS.

The failover console 14 then prompts the user and receives user input specifying resource information for the failover destination (203). This information can include, for example, the network name, resource group, IP address, subset mask and network adapter type of the failover destination. The user can select from one or more predefined lists and/or input other information here.

The failover console 14 then prompts the user and receives user input specifying the names of the failover source's (primary site's) storage resources and the failover destination's (failover site's) storage resources (204), such as the primary and failover storage servers' names, LUN paths and LUN initiator details. The LUN initiator details can include, for example, whether to use iSCSI or FCP to connect the LUN, and which initiator to use to connect the LUN to the host. The failover console 14 then prompts the user and receives user input selecting, from a list, one or more mirroring destination volumes at the failover site (205).

The failover console 14 then prompts the user and receives user input identifying the LUN initiators to use for the LUN connections from the failover destination host to the failover storage resources (206). Next, the failover console 14 prompts the user and receives user input specifying a name for the failover plan and a brief description of the failover plan (207). Finally, the failover console 14 saves all of the above-mentioned user-input information as the failover plan in a predetermined format, in at least one node of the selected failover destination. If the failover destination includes multiple nodes (i.e., is a cluster), then the failover plan can be stored in more than one of those nodes for redundancy. Additionally, the failover plan can be stored at the primary site (the failover source) 4A and/or other sites for further redundancy. In one embodiment, the failover plan is stored as an XML document and treated as an object by the system.

Figure 3:
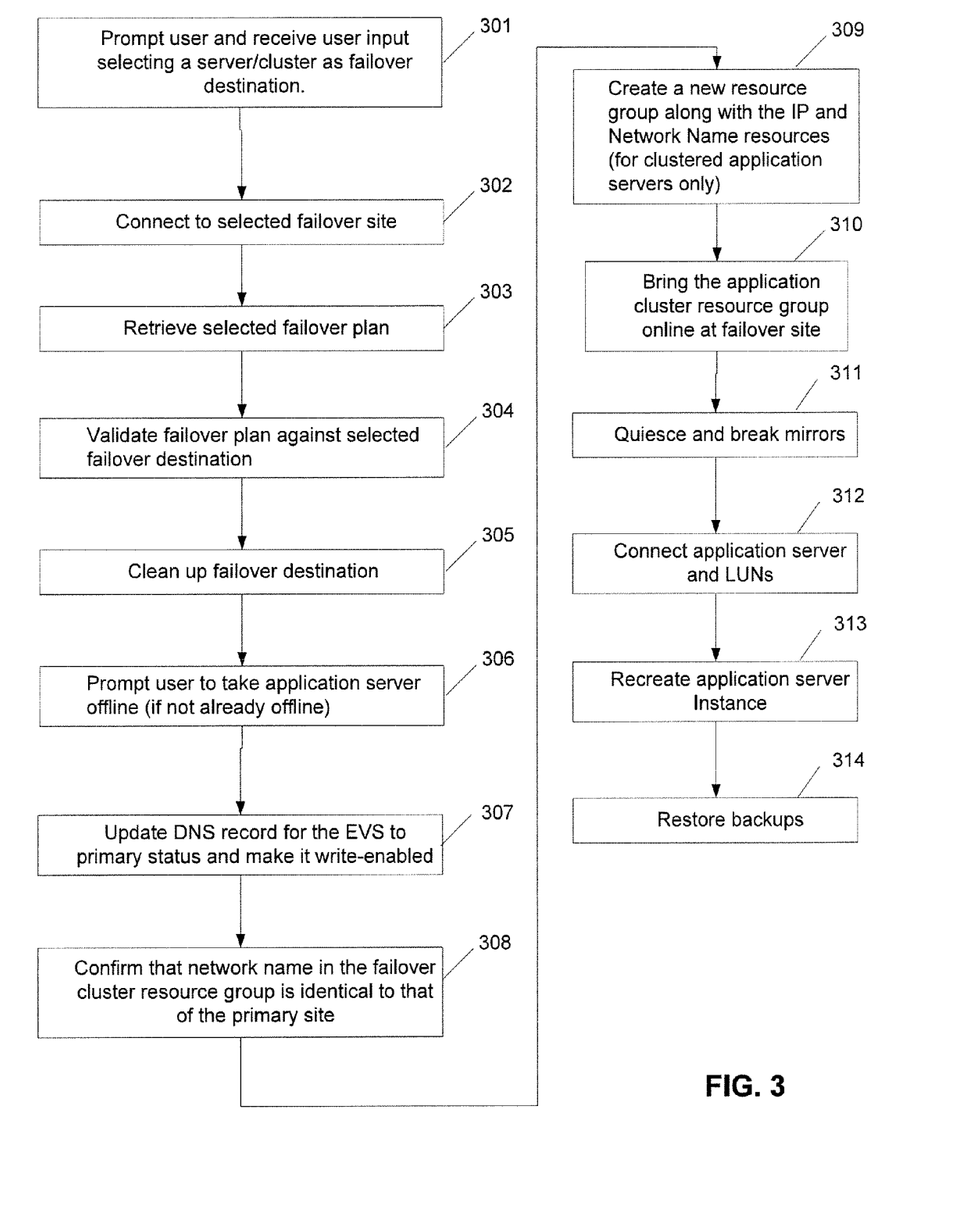
FIG. 3 is a flow diagram illustrating a process for executing a failover based on a failover plan.

A failover process can be executed, based on a previously defined failover plan, in response to a failure at the primary site 4A or as a planned failover event (e.g., to allow an upgrade or maintenance on the primary site). FIG. 3 illustrates an example of the process of executing a failover based on a previously defined failover plan. In one embodiment, the failover process is triggered manually by a user activating a control in the user interface generated by the failover console (e.g., "Initiate Failover"). In another embodiment, the process can be triggered automatically by the failover console in response to detection of a significant fault at the primary site (e.g., a site crash).

During the failover process, if a step cannot be completed successfully, an appropriate error message will be output to the user, and if the error is severe enough, the process will be aborted. To simplify explanation, however, FIG. 3 and the following description assume that each step completes successfully.

When the failover process is triggered, the failover console 14 initially displays a list of servers or server clusters (hosts) that can be selected as the failover destination. The failover console 14 then prompts the user to select one of them as the failover destination and receives user input specifying the user's selection (301). Next, the failover console 14 connects to the user-selected failover destination (302).

The failover console 14 then reads the selected failover plan from wherever it is stored (303). The failover console 14 stores an indication of where the failover plan is stored for each failover destination. As noted above, the failover plan is at least stored at the failover site 4B, such as in one or more nodes 1B of cluster 2B. In one embodiment the selection of the failover destination (301) uniquely identifies the failover plan, i.e., there is exactly one failover plan for a given failover destination. In other embodiments, multiple failover plans can be defined for a given failover site, and the user has the ability to select from among them to perform a failover process.

Next, in response to an appropriate command from the user (e.g., "Execute"), the failover console 14 validates the failover plan against the selected failover destination (304). This involves validating the failover plan against the state of the selected failover destination and the application server (e.g., Exchange) instance 3, if it is running, to determine whether the data in the failover plan is consistent and valid. This is done because the failover plan could potentially become stale and require updating, for example, after a configuration change at the failover destination.

In one embodiment, the failover console 14 performs at least three types of validation in this step (304). First, it validates the failover destination host configuration by making sure all specified servers, LUNs, and other resources actually exist and are accessible. If there is any mismatch between the failover plan and the state of the failover destination in this regard, error details will be displayed to the user. For example, if nodes have been added or removed from the destination cluster since the definition of the failover configuration data, the user will be prompted to modify the failover plan to reflect the current state of the failover destination. Second, the failover console 14 validates that the LUN connection parameters are correct, by making sure that the LUN path is valid and that the specified initiator can be used to connect the LUN.

Third, the failover console 14 validates the state of the failover mirroring relationships, i.e., it makes sure the relevant mirrors are up-to-date. For example, if there are three snapshots at the source site 4A, those three snapshots should also be present at the destination site 4B. If that is not the case, the failover process can potentially use the next oldest snapshot which exists at both source and destination. In certain embodiments, the failover console 14 may also confirm that the replication lag between the source and the destination is within a certain threshold, as part of the validation step.

Next, the failover console 14 "cleans up" the failover destination (305). In one embodiment this involves disconnecting any previous storage resources at the failover destination as well as deleting the footprint of any server that previously failed over to the failover destination. In one embodiment, the Microsoft power shell command "setup.exe /ClearLocaICMS" is used to delete any such footprint. If the failover process is part of a planned failover, a complete backup of all of the storage groups on the failover source (primary site) is performed, by using the mirroring application instances 11A and 11B.

Next, the failover console 14 prompts the user to take the application server 3 (e.g., Exchange) offline at the primary site 4A if it is not already offline (306). In other embodiments, the failover console 14 may automatically take the application server 3 off-line. In this context the primary site 4A being off-line is defined as being powered off, completely disconnected from the network, or that its cluster resource groups are offline (Microsoft Cluster Manager defines cluster "resource groups" to define a virtual machine and the services it provides). In the case of a clustered Exchange server, only one EVS with the same name should be online at any given time, and the same name should be maintained at both the primary and failover sites. In the case of standalone (non-clustered) servers, the names can be different at each site.

Since the IP address for the EVS at the failover site 4B will likely be different from that of the primary site, the DNS record for the EVS should be updated. Accordingly, the failover console 14 then updates the DNS record for the EVS, i.e., converts the DNS running on the failover site to "primary" status and make sure it is write-enabled (307).

The failover console 14 then confirms that the Network Name resource in the failover cluster resource group is identical to that of the primary site 4A (308). If the Network Name cluster resource does not exist on the failover cluster 2B at the time of failover, then it is created at this time by the backup management application 9. This step is also not required for non-clustered application servers, since the host name will be different at both sites.

Next, the failover console 14 creates a new cluster resource group along with the IP and Network Name resources (309) in one or more nodes 1B of the failover site 4B. The failover console 14 then brings the application cluster resource group online at the failover site 4B (310). Of course, these steps are also not required for non-clustered application servers.

Next, the failover console 14 quiesces and breaks the mirror relationships specified in the failover plan, if that has not already been done (311).

The failover console 14 then connects the application server 3 at the failover site 4B with LUNs 8B at the failover site 4B (312). In one embodiment, this step is carried out partially by the LUN manager 10 at the failover site 4B and partially by the backup management application 9 at the failover site, and it involves the following substeps:

First, the LUN manager 10 failover site 4B determines which volumes are qualified to be restored by the backup management application 9. For example, in some embodiments, only snapshots created by the backup management application 9 can be restored by the backup management application 9. Next, the backup management application 9 restores the application databases and requests the LUN Manager 10 to restore the LUNs 8B (e.g., using Windows "volume" (LUN) restores). The LUN manager 10 then connects any backup metadata LUNs and application (e.g., Exchange) transaction log LUNs, using the LUN details contained in the failover plan. The LUN Manager 10 then connects the application database LUNs, again using the LUN details in the failover plan. For clustered configurations, the LUNs are connected as "shared" and placed into the application cluster resource group. For non-clustered configurations, the LUNs are connected as "dedicated."

Next, the failover console 14 recreates the application server 3 instance at the failover site (313) by using cluster APIs; for example, assuming a clustered configuration the failover console 14 can recreate an EVS within the cluster group 2B using Microsoft Cluster Manager. Also assuming a clustered system, this can include the failover console 14 resetting the machine account for the EVS in Active Directory in domain controller 13B at the failover site 4B, if necessary (certain versions of certain application servers may require this to be done and others may not).

Finally, the backup management application 9 restores the most recent backup of the application server 3 and its data from the mirrored LUNs at the failover site 4B (314).

Figure 4:
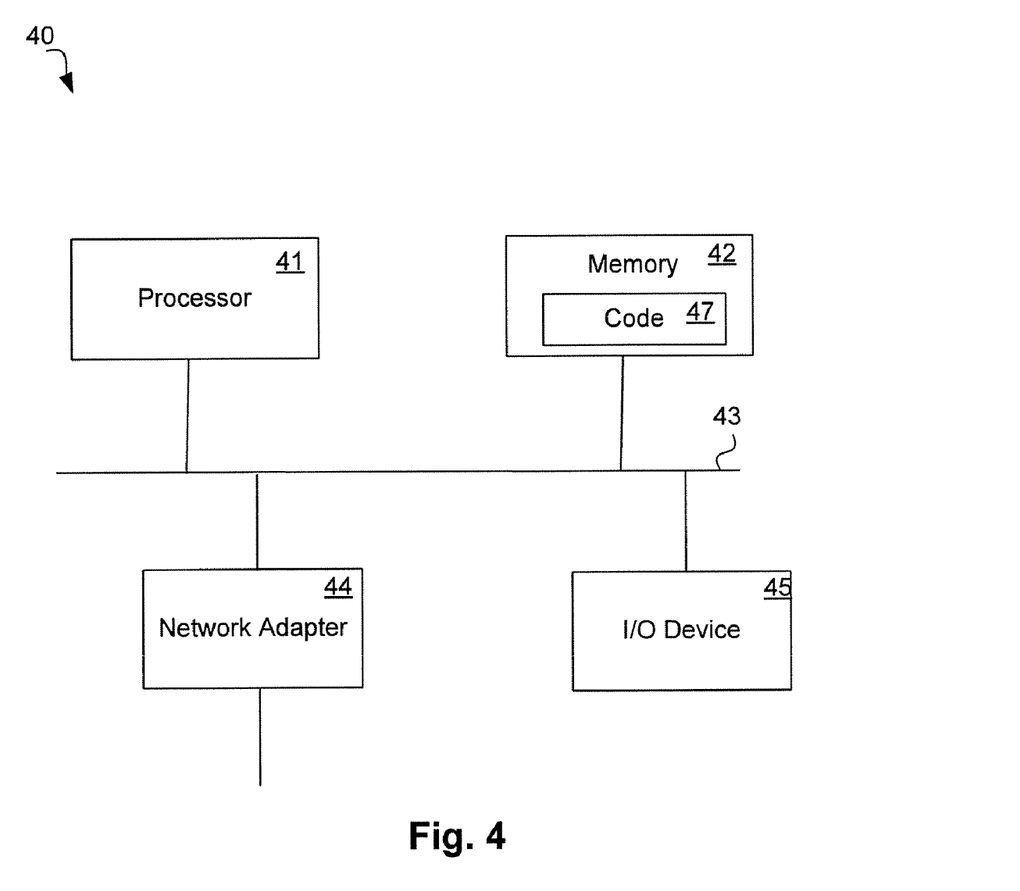
FIG. 4 is a high-level block diagram showing the architecture of a computer system representative of any of the computer systems in FIG. 1.

FIG. 4 is a high-level block diagram showing the architecture of a computer system 40 representative of any of the computer systems shown in FIG. 1, such as a cluster node, a storage server or the management terminal. In the illustrated embodiment, the computer system 40 includes one or more processors 41 and memory 42 coupled to an interconnect 43. The interconnect 43 shown in FIG. 4 is an abstraction that represents any one or more separate physical buses, point-to-point connections, or both, connected by appropriate bridges, adapters, or controllers. The interconnect 43, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 41 is/are the central processing unit (CPU) of the computer system and, thus, control the overall operation of the computer system. In certain embodiments, the processor(s) 41 accomplish this by executing software and/or firmware stored in memory 42. The processor(s) 41 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 42 is, or includes, the main memory of the computer system. The memory 42 represents any form of random access memory (RAM), read-only memory (ROM), flash memory, or the like, or a combination of such devices. In use, the memory 42 may store, among other things, code 47 embodying an operating system, as well as software and/or firmware that configures the processor 41 to execute some or all of the operations and functionality described above.

Also connected to the processor(s) 41 through the interconnect 43 are a network adapter 44 and one or more other input/output (I/O) devices. The network adapter 44 provides the computer system with the ability to communicate with other devices via a network, such as a LAN and/or WAN, and may be, for example, an Ethernet adapter or Fibre Channel adapter. The other I/O device(s) 45 may include any one or more of, for example (depending on the assigned purpose of the computer system): a storage adapter to access a mass storage subsystem, a user input device such as a keyboard, mouse, touchscreen, or speech recognition subsystem; an output device such as a display device or audio speaker; etc.

Thus, a method and apparatus for creating and executing a failover plan for an application on a computer network have been described.

The techniques described above can be implemented in programmable circuitry programmed with software and/or firmware, or entirely in special-purpose hardwired circuitry, or in a combination of such forms. Programmable circuitry can be or include one or more programmable microprocessors, for example. Special-purpose hardwired circuitry may be in the form of, for example, one or more ASICs, PLDs, FPGAs, etc.

Software or firmware to configure a processor to execute the functionality described here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims.

Accordingly, the specification and drawings are to be regarded in an illustrative sense rather than a restrictive sense.

What is claimed is:

1. A method comprising:
    accessing, by a processor, a user-defined failover plan stored on a computer system, the failover plan including user-specified information for use by a plurality of operations of a failover process for failing over a server system from a primary site to a failover site, the failover plan further including information descriptive of a plurality of LUN connections, the primary site and the failover site each including a plurality of server nodes; and
    causing, by the processor, the failover process to be executed on the failover site based on the failover plan, to cause the server system to be failed over to the failover site, wherein after completion of the failover process, the server system is virtualized across a cluster of server nodes at the failover site.

2. A method as recited in claim 1, wherein the failover plan is stored on the computer system as a data object.

3. A method as recited in claim 1, wherein the server system comprises an application server.

4. A method as recited in claim 3, wherein the application server comprises an electronic messaging server.

5. A method as recited in claim 1, further comprising:
    prior to said accessing, generating a user interface to allow an administrative user to specify inputs to define the failover plan.

6. A method as recited in claim 1, wherein the failover process comprises reconstructing the server system and data used by the server system, on the failover site, by using data previously mirrored from the primary site to the failover site.

7. A method as recited in claim 1, wherein the failover plan includes:
    information specifying a failover source, a failover destination, and a plurality of storage resources at the failover source and the failover destination; and
    information descriptive of a plurality of mirroring relationships between the primary site and the failover site.

8. A method comprising:
    generating, by a processor, a graphical user interface to allow a user to specify inputs to define a failover plan for failing over a server system from a primary site to a failover site;
    receiving, by the processor, via the graphical user interface, user inputs for specifying the failover plan, including information for use by a plurality of operations of a failover process for failing over the server system from the primary site to the failover site;
    causing the failover plan to be stored as a data object at the failover site, by the processor, the failover site including a plurality of server nodes, wherein the failover plan includes information descriptive of a plurality of LUN connections; and
    causing the failover process to be executed on the failover site, by the processor, based on the failover plan, to cause the server system to be failed over to the failover site, wherein after completion of the failover process, the server system is virtualized across a cluster of server nodes at the failover site.

9. A method as recited in claim 8, wherein the server system comprises an application server.

10. A method as recited in claim 9, wherein the application server comprises an electronic messaging server.

11. A method as recited in claim 8, wherein the failover process comprises reconstructing the server system and data used by the server system, on the failover site, by using data previously mirrored from the primary site to the failover site.

12. A method as recited in claim 8, wherein the failover plan includes:
    information specifying a failover source, a failover destination, and a plurality of storage resources at the failover source and the failover destination; and
    information descriptive of a plurality of mirroring relationships between the primary site and the failover site.

13. A method comprising:
    generating a graphical user interface on a network management terminal to allow an administrative user to specify inputs to define a failover plan for failing over an electronic messaging server from a primary site to a failover site, where the primary site and the failover site each include a plurality of host computers;
    receiving, via the graphical user interface, user inputs for specifying the failover plan, including information for use by a plurality of operations of a failover process for failing over the server system from the primary site to the failover site;
    causing the failover plan to be stored as a data object at the failover site, the failover plan including information descriptive of a plurality of LUN connections;
    accessing the failover plan at the failover site; and
    in response to a user input, causing the failover process to be executed on the failover site based on the failover plan, to cause the electronic messaging server to be failed over to the failover site, wherein the failover process includes reconstructing the electronic messaging server and a plurality of databases used by the electronic messaging server, on the failover site, by using data previously mirrored from the primary site to the failover site, wherein after completion of the failover process, the electronic messaging system is virtualized across a cluster of server nodes at the failover site.

14. A method as recited in claim 13, wherein the failover plan includes:
    information specifying a failover source, a failover destination, and a plurality of storage resources at the failover source and the failover destination; and
    information descriptive of a plurality of mirroring relationships between the primary site and the failover site.

15. A machine-readable storage medium having code stored thereon which, when executed by a machine, causes the machine to execute a set of operations, the set of operations comprising:
    generating a graphical user interface to allow a user to specify inputs to define a failover plan for failing over a server system from a primary site to a failover site;
    receiving, via the graphical user interface, user inputs for specifying the failover plan, including information for use by a plurality of operations of a failover process for failing over the server system from the primary site to the failover site, wherein the failover plan includes:
        information specifying a failover source, a failover destination, and a plurality of storage resources at the failover source and the failover destination,
        information descriptive of a plurality of mirroring relationships between the primary site and the failover site; and
        information descriptive of a plurality of LUN connections;
    causing the failover plan to be stored as a data object on at least one of the primary site and the failover site; and
    accessing the failover plan in response to a specified condition being satisfied; and in response to a user input, causing the failover process to be executed on the failover site based on the failover plan, to cause the server system to be failed over to the failover site, wherein after completion of the failover process, the server system is virtualized across a cluster of server nodes at the failover site.

16. A machine-readable storage medium as recited in claim 15, wherein the failover process includes reconstructing the server system and data used by the server system, on the failover site, by using data previously mirrored from the primary site to the failover site.

17. A machine-readable storage medium as recited in claim 15, wherein the server system comprises an application server.

18. A machine-readable storage medium as recited in claim 17, wherein the application server comprises an electronic messaging server.

19. A processing system comprising:
a primary site, including a first host computer configured to run an application server, and a first storage server;
a failover site, coupled to the primary site via a network, the failover site including a second host computer and a second storage server;
a backup management application installed so as to execute on the primary site to backup the application server and corresponding data to the first storage server;
wherein the first storage server and the second storage server each include a mirroring application configured to cause the application server and corresponding data to be mirrored from the primary site to the failover site; and
a failover module to generate a user interface configured to allow a user to specify inputs to define a failover plan for failing over the primary site to the failover site, the failover plan including user-specified information for use by a plurality of operations of a failover process for failing over the application server from the primary site to the failover site, the failover plan further including information descriptive of a plurality of LUN connections, the failover module further to cause the failover plan to be stored at the failover site, to cause the failover plan to be accessed in response to a specified condition being satisfied, and to cause the failover process to be executed on the failover site based on the failover plan, such that after completion of the failover process, the server system is virtualized across a cluster of server nodes at the failover site.

20. A processing system as recited in claim 19, wherein the failover process comprises reconstructing the application server and corresponding data on the failover site, by using data previously mirrored from the primary site to the failover site.

21. A processing system as recited in claim 19, wherein the failover plan is stored as a data object at the failover site.

22. A processing system as recited in claim 19, wherein the application server comprises an electronic messaging server.

23. A processing system as recited in claim 20, wherein the failover plan includes:
information specifying a failover source, a failover destination, and a plurality of storage resources at the failover source and the failover destination, and
information descriptive of a plurality of mirroring relationships between the primary site and the failover site.

\* \* \* \* \*